(12) United States Patent
Yoshimoto

(10) Patent No.: US 8,917,053 B2
(45) Date of Patent: Dec. 23, 2014

(54) ELECTRIC POWER CONVERTER WITH TRANSFORMER

(75) Inventor: Kantaro Yoshimoto, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 803 days.

(21) Appl. No.: 13/144,576

(22) PCT Filed: Dec. 15, 2009

(86) PCT No.: PCT/JP2009/006893
§ 371 (c)(1),
(2), (4) Date: Jul. 14, 2011

(87) PCT Pub. No.: WO2010/082275
PCT Pub. Date: Jul. 22, 2010

(65) Prior Publication Data
US 2011/0273136 A1 Nov. 10, 2011

(30) Foreign Application Priority Data
Jan. 15, 2009 (JP) .................. 2009-006543

(51) Int. Cl.
*H01M 10/46* (2006.01)
*H02M 1/10* (2006.01)
*H02M 3/335* (2006.01)
*H02M 3/337* (2006.01)

(52) U.S. Cl.
CPC ............ *H02M 1/10* (2013.01); *H02M 3/33592* (2013.01); *H02M 3/3372* (2013.01); *Y02B 70/1475* (2013.01)
USPC ....................................................... 320/103

(58) Field of Classification Search
USPC ............................ 320/103, 107, 134, 138, 140
See application file for complete search history.

(56) References Cited

U.S. PATENT DOCUMENTS

| 5,886,880 A | 3/1999 | Hisanaga |
| 7,450,403 B2 | 11/2008 | Lanni |
| 2005/0093373 A1 | 5/2005 | Chapman et al. |

(Continued)

FOREIGN PATENT DOCUMENTS

| CN | 1996747 A | 7/2007 |
| EP | 1 515 412 A1 | 3/2005 |

(Continued)

OTHER PUBLICATIONS

Decision on Grant issued on Jul. 5, 2012 (17pgs).

*Primary Examiner* — Edward Tso
(74) *Attorney, Agent, or Firm* — Foley & Lardner LLP

(57) ABSTRACT

An electric power converter (1A) transmits and receives, via a transformer (14), electric power between alternating current power source (2) and second battery (4) or between first battery (3) and second battery. The electric power converter includes: a common bus bar (CB) for connecting the following members to primary winding (141a, 141b) of transformer (14): first electrode of alternating current power source, and first electrode of first battery; a first switch circuit (13) for selectively connecting the following members to primary winding (141a, 141b) of transformer: second electrode of alternating current power source, and second electrode of first battery; a second switch circuit (15) for connecting second battery to secondary winding (142a, 142b) of transformer; and a controller (100) for controlling the electric power of the alternating current power source, first battery and second battery by turning on and off switches of the first and second switch circuits (13, 15).

12 Claims, 14 Drawing Sheets

(56) References Cited

U.S. PATENT DOCUMENTS

| | | |
|---|---|---|
| 2007/0194746 A1 | 8/2007 | Yoshimoto |
| 2008/0174277 A1* | 7/2008 | Ueno ............................ 320/138 |
| 2008/0174278 A1* | 7/2008 | Masias et al. ................. 320/138 |
| 2008/0316774 A1 | 12/2008 | Ito et al. |
| 2009/0079394 A1* | 3/2009 | Richards et al. .............. 320/134 |
| 2010/0060239 A1* | 3/2010 | Lundqvist et al. ............ 320/138 |

FOREIGN PATENT DOCUMENTS

| | | |
|---|---|---|
| EP | 1 615 325 A2 | 1/2006 |
| EP | 1 264 385 B1 | 12/2006 |
| JP | 2-193544 A | 7/1990 |
| JP | 6-66907 A | 3/1994 |
| JP | 6-205546 A | 7/1994 |
| JP | 8-88907 A | 4/1996 |
| JP | 8-154311 A | 6/1996 |
| JP | 8-317508 A | 11/1996 |
| JP | 10-336918 A | 12/1998 |
| RU | 44 893 U1 | 8/2004 |

\* cited by examiner

FIG. 2
(a)
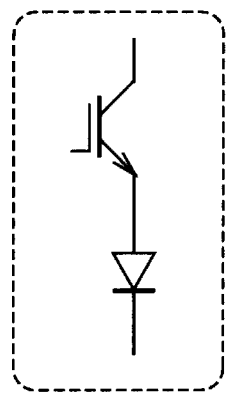
(b)
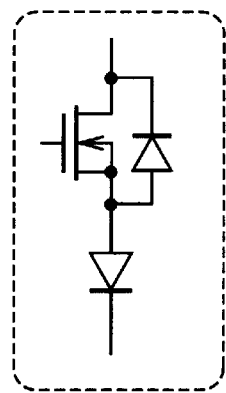
(c)
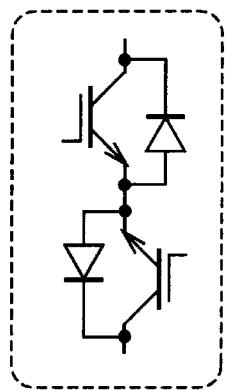
(d)
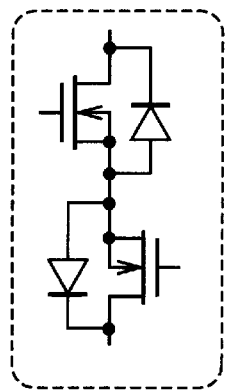

FIG. 3
(a)
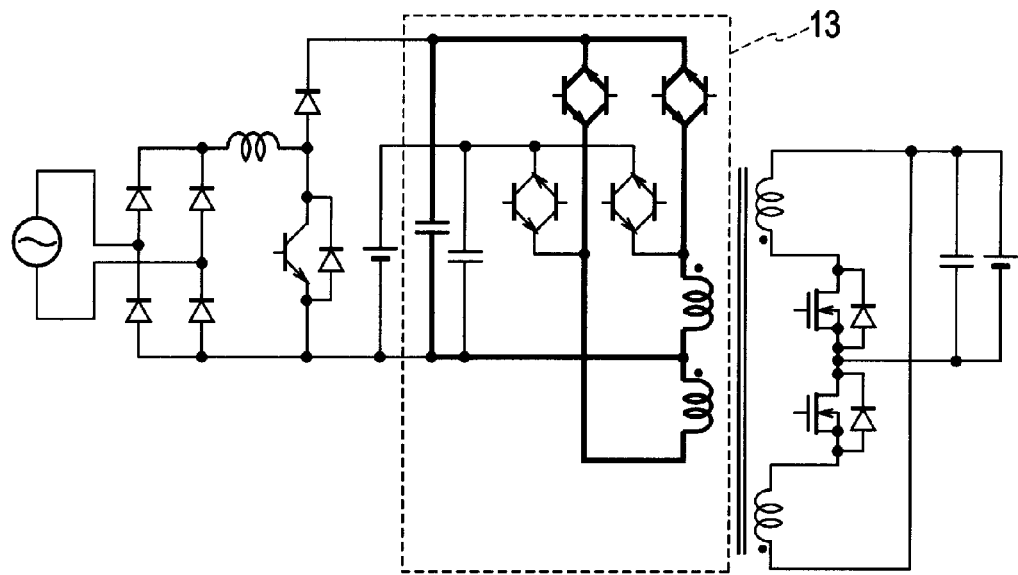
(b)
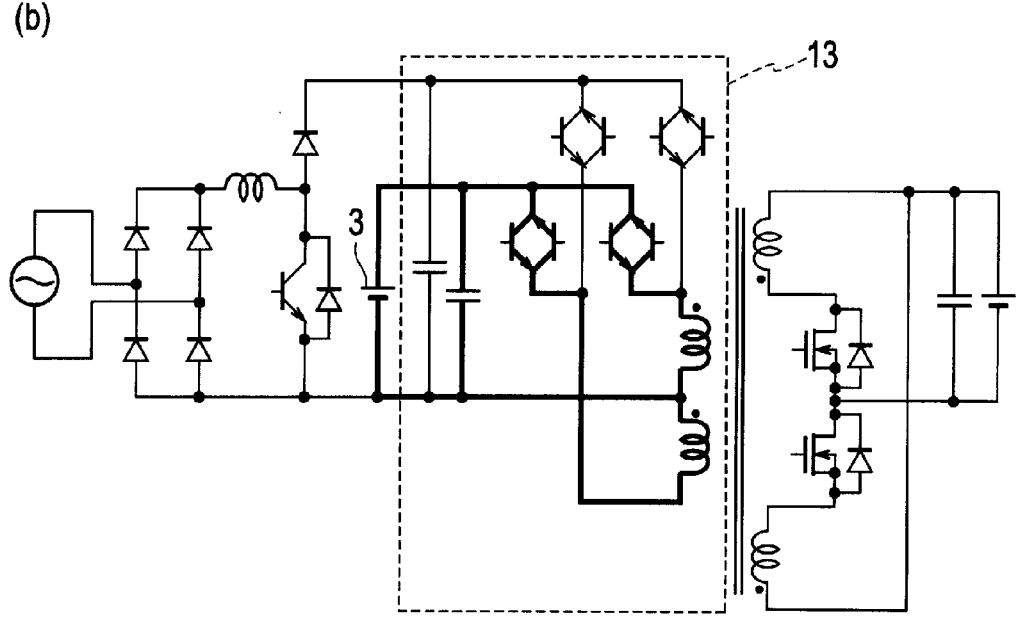

FIG. 4
(a)
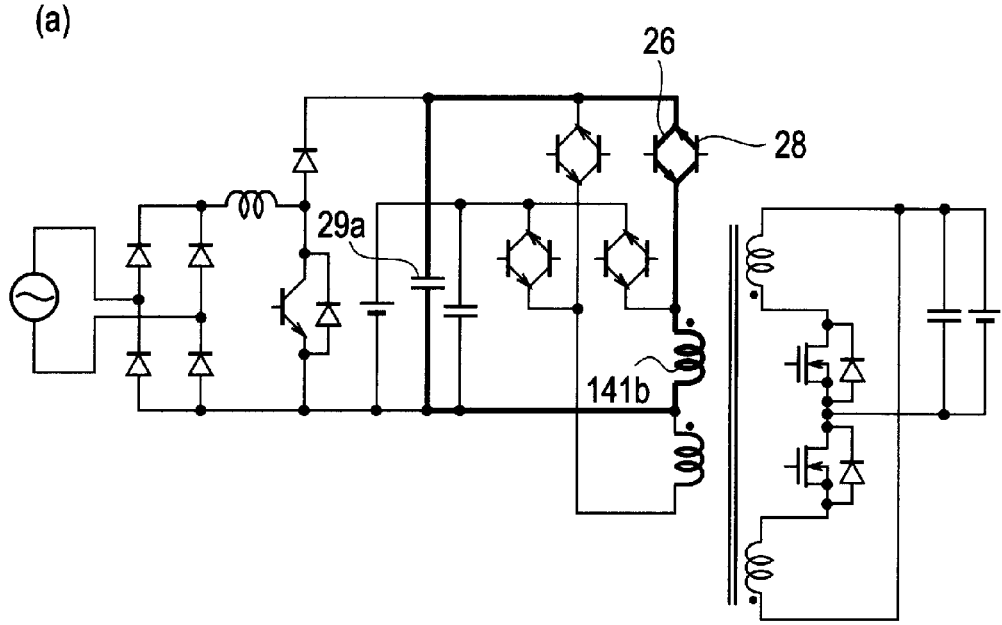
(b)
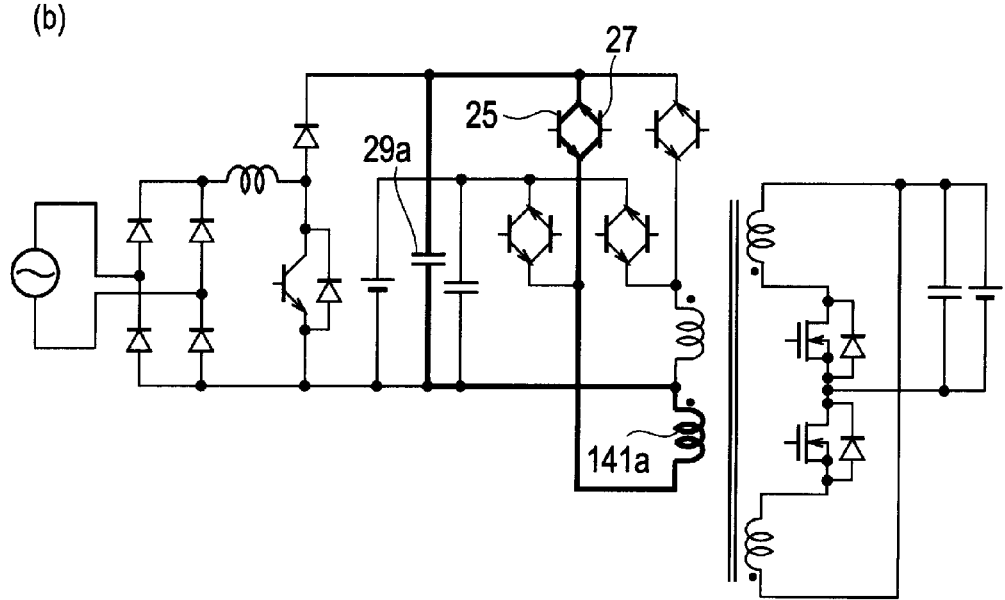

FIG. 5
(a)
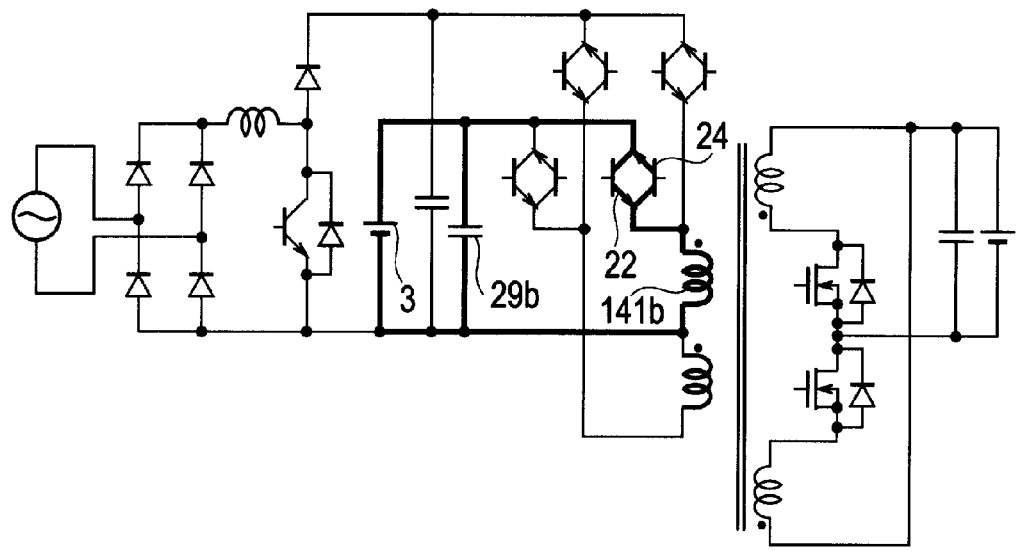
(b)
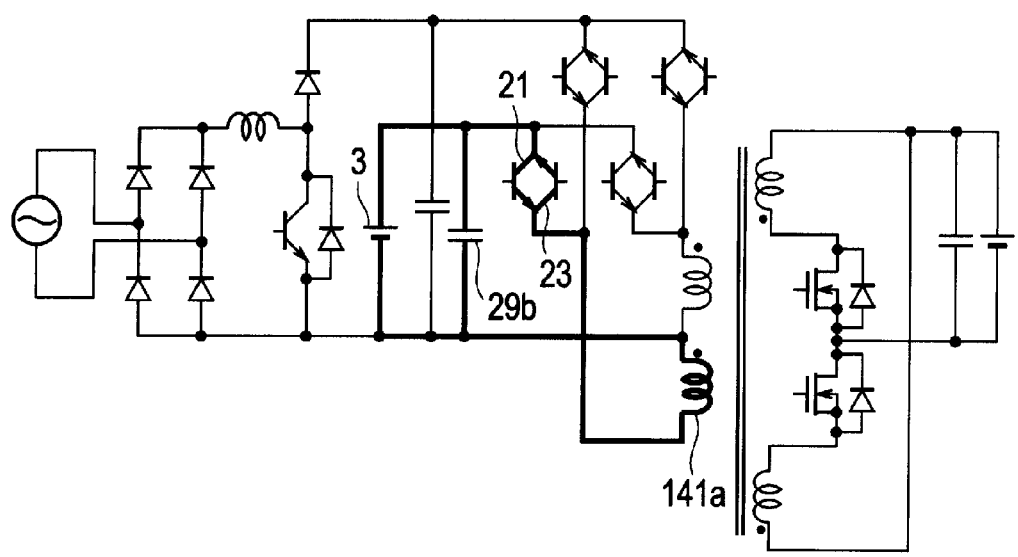

FIG. 9
(a)
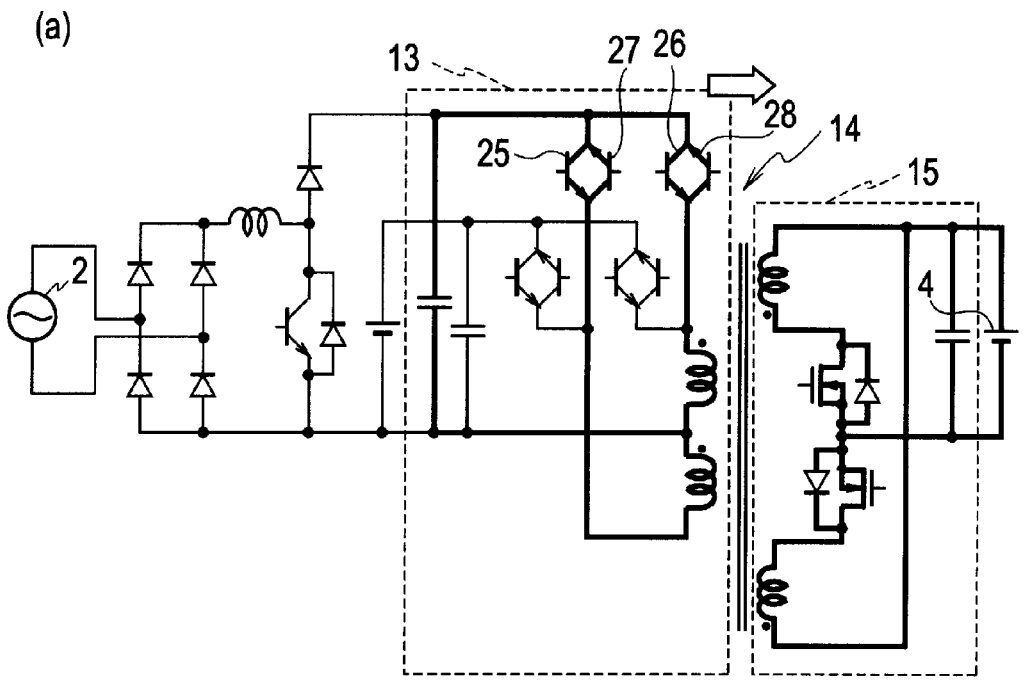
(b)
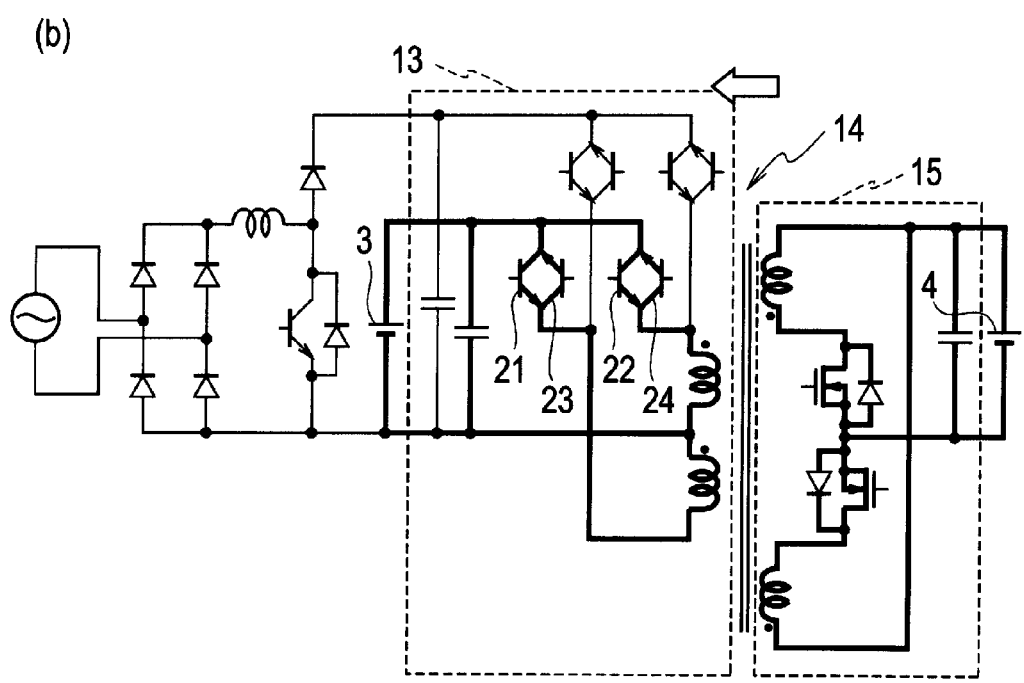

ELECTRIC POWER CONVERTER WITH TRANSFORMER

TECHNICAL FIELD

The present invention relates to an electric power converter using a transformer. Especially, the present invention relates to the electric power converter which is preferably installed in an electric vehicle.

BACKGROUND ART

In general, an electric vehicle includes: i) a charger for charging, from an external alternating current power source (socket), a main battery for driving a vehicle and ii) a DC-DC converter for charging, from the main battery, an accessory battery for driving accessories. The charger and the DC-DC converter form a circuit which uses a transformer for insulating a high-voltage circuit from a low-voltage circuit, where the high-voltage circuit is connected to the main battery while the low-voltage circuit includes the alternating current power source and the accessory battery. Recently, the person skilled in the art is trying to integrate the charger with the DC-DC converter. Patent document 1 discloses an electric power converter having such a structure that three windings, that is, a winding for a main battery, a winding for an alternating current power source and a winding for an accessory battery share a single transformer and are wound around a common core, where an electric power conversion is accomplished by way of the common core.

CITATION LIST

Patent Literature

[PTL 1] Japanese Patent Application Laid-Open No. Heisei 8 (1996)-317508 (=JP8317508)

SUMMARY OF INVENTION

Technical Problem

However, although the electric power converter set forth in JP8317508 has such a structure that the common core is used for sharing the transformer, the transformer is large in size for securing a space for winding the three windings around the common core, thus enlarging the converter in its entirety.

Solution to Problem

For solving the above conventional inconveniences, it is therefore an object of the present invention to provide an electric power converter capable of accomplishing a small size in its entirety.

According to a first aspect of the present invention, there is provided an electric power converter for transmitting and receiving, by way of a transformer, an electric power between an alternating current power source and a second battery or between a first battery and the second battery, the electric power converter comprising: a common bus bar for connecting the following members to a primary winding of the transformer: a first electrode of the alternating current power source, and a first electrode of the first battery; a first switch circuit for selectively connecting the following members to the primary winding of the transformer: a second electrode of the alternating current power source, and a second electrode of the first battery, wherein the first switch circuit is adapted to implement an electric power conversion; a second switch circuit for connecting the second battery to a secondary winding of the transformer, wherein the second switch circuit is adapted to implement the electric power conversion; and a controller for controlling the electric power of each of the alternating current power source, the first battery and the second battery by turning on and off a switch of the first switch circuit and a switch of the second switch circuit.

According to a second aspect of the present invention, there is provided an electric power converting method for transmitting and receiving, by way of a transformer, an electric power between an alternating current power source and a second battery or between a first battery and the second battery, the method comprising: connecting the following members to a primary winding of the transformer: a first electrode of the alternating current power source, and a first electrode of the first battery; selectively connecting the following members to the primary winding of the transformer: a second electrode of the alternating current power source, and a second electrode of the first battery, wherein the selective connecting operation is adapted to implement an electric power conversion; connecting the second battery to a secondary winding of the transformer, wherein the connecting of the secondary winding is adapted to implement the electric power conversion; and controlling the electric power of each of the alternating current power source, the first battery and the second battery by turning on and off a switch of the first switch circuit and a switch of the second switch circuit.

According to a third aspect of the present invention, there is provided an electric power converter for transmitting and receiving, by way of a transforming means, an electric power between an alternating current power sourcing means and a second electricity storing means or between a first electricity storing means and the second electricity storing means, the electric power converter comprising: a common connecting means for connecting the following members to a primary winding means of the transforming means: a first electrode of the alternating current power sourcing means, and a first electrode of the first electricity storing means; a first switching means for selectively connecting the following members to the primary winding means of the transforming means: a second electrode of the alternating current power sourcing means, and a second electrode of the first electricity storing means, wherein the first switching means is adapted to implement an electric power conversion; a second switching means for connecting the second electricity storing means to a secondary winding means of the transforming means, wherein the second switching means is adapted to implement the electric power conversion; and a controlling means for controlling the electric power of each of the alternating current power sourcing means, the first electricity storing means and the second electricity storing means by turning on and off a switching means of the first switching means and a switching means of the second switching means.

According to a fourth aspect of the present invention, there is provided an electric power converter for transmitting and receiving, by way of a transformer, an electric power between a plurality of voltages and an output voltage, the electric power converter comprising: a common bus bar for connecting a first end side of each of the plurality of the voltages to a primary winding of the transformer; a first switch circuit for selectively connecting a second end side of the each of the plurality of the voltages to the primary winding of the transformer, wherein the first switch circuit is adapted to implement an electric power conversion; a second switch circuit for connecting the output voltage to a secondary winding of the transformer, wherein the second switch circuit is adapted to implement the electric power conversion; and a controller for controlling the electric power of each of the plurality of the voltages and the electric power of the output voltage by turning on and off a switch of the first switch circuit and a switch of the second switch circuit.

Advantageous Effects of Invention

With the electric power converter of the present invention, a single transformer using members in common up to windings is used for properly transmitting and receiving an electric power among an alternating current power source, a first battery and a second battery, thus accomplishing a small size of the converter in its entirety.

BRIEF DESCRIPTION OF DRAWINGS

FIG. 2 explains a structure of an interactive switch.

FIG. 3 explains operation of an inverter circuit on a primary side.

FIG. 4 explains switchings when the inverter circuit on the primary side is operated as an inverter.

FIG. 5 explains switchings when the inverter circuit on the primary side is operated as a converter.

FIG. 9 explains a path for charging a second battery by supplying an electric power from an alternating current power source to the secondary side by way of a common transformer and a path for charging the first battery by supplying an electric power from the second battery to the primary side by way of the common transformer.

DESCRIPTION OF EMBODIMENTS

Hereinafter, embodiments of the present invention are to be set forth referring to drawings.

First Embodiment

Structure

Figure 1:
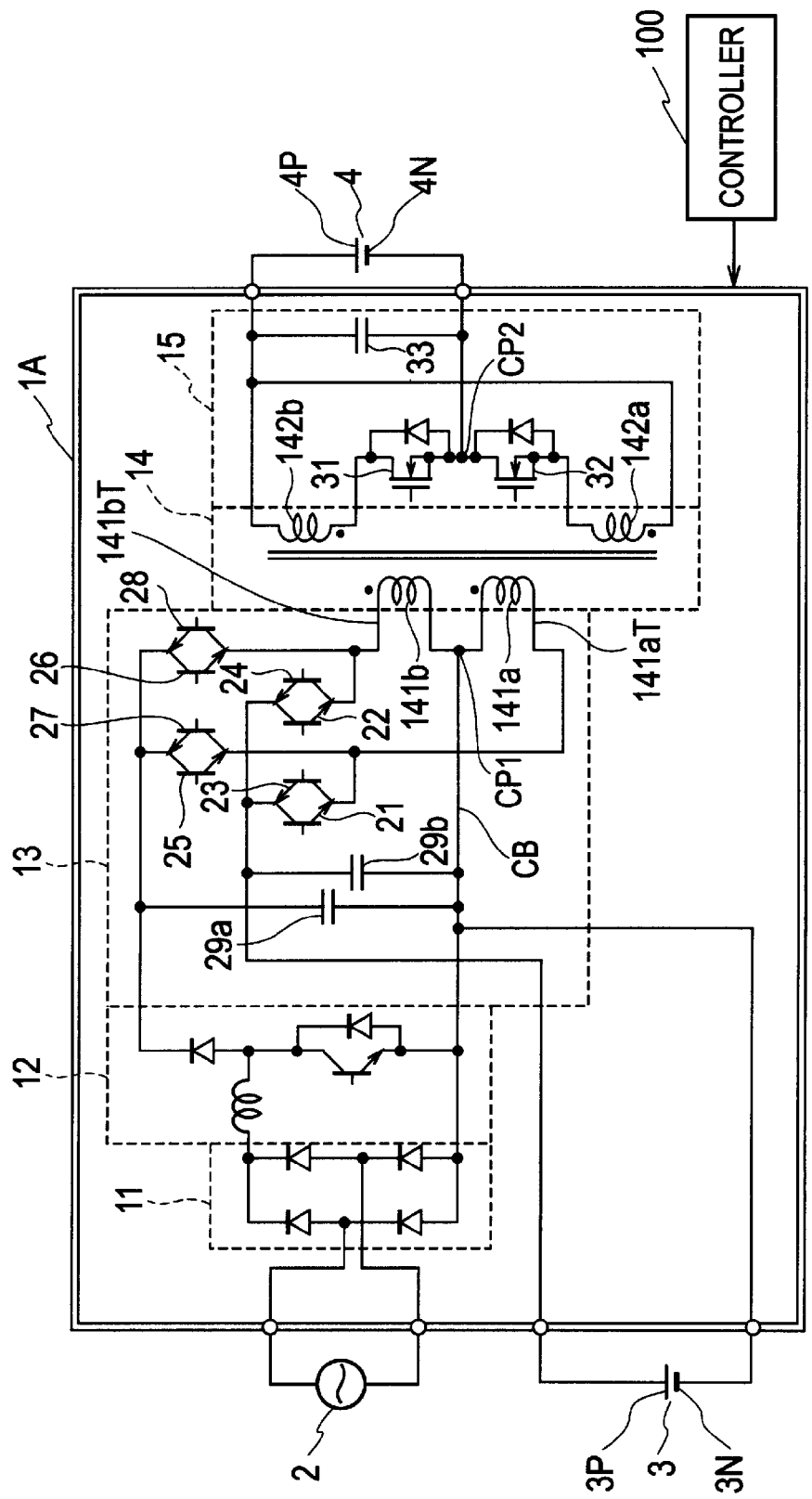
FIG. 1 is a circuit diagram showing a structure of an electric power converter, according to a first embodiment of the present invention.

FIG. 1 is a circuit diagram showing a structure of an electric power converter 1A, according to a first embodiment of the present invention. By way of a transformer, the electric power converter 1A of the first embodiment transmits and receives an electric power between i) one of an alternating current power source 2 and a first battery 3 and ii) a second battery 4. The electric power converter 1A is preferably installed, for example, in an electric vehicle. For installing the electric power converter 1A in the electric vehicle, for example, the alternating current power source 2 acts as an external power source of a single-phase 100 Vrms, the first battery 3 acts as a low-voltage battery (for example, 12 V lead battery) for driving accessories, and the second battery 4 acts as a high-voltage battery of about 300 V. In sum, the electric power converter 1A accomplishes such functions as charging the high-voltage battery from the external power source, and charging the low-voltage battery (for driving accessories) by lowering an output voltage of the high-voltage battery. The high-voltage battery of the electric vehicle is insulated from the ground (vehicular body), therefore, merely touching any one of + and − does not cause an electric shock, which brings about a safe design. On the other hand, since the low-voltage battery is grounded with the vehicular body and a first side of the alternating current power source is also grounded, the low-voltage battery is insulated from the high-voltage battery by way of the transformer. Moreover, not only to the electric vehicle, the power transformer of the present invention is widely used for transmitting and receiving, by way of the transformer, the electric power between a plurality of voltages and an output voltage. In terms of a combination of a plurality of voltages and the output voltage, not only a combination of a power source and batteries, there is also a combination of a power source and loads and a combination of batteries and loads.

The electric power converter 1A of the first embodiment has connection terminals, that is, a terminal connected to the alternating current power source 2, a terminal connected to the first battery 3 and a terminal connected to the second battery 4, as is seen in FIG. 1. In the electric power converter 1A, there are provided a rectifier 11, a PFC (Power Factor Correction) circuit 12, a first inverter circuit 13 (first switch circuit), a common transformer 14 and a second inverter circuit 15 (second switch circuit).

With the electric power converter 1A, an electric power inputted from the alternating current power source 2 is rectified by the rectifier 11 which includes a diode bridge. Then, by way of the PFC circuit 12, the electric power is inputted to the first inverter circuit 13 which implements a DC-AC conversion. Moreover, a negative electrode 3N of the first battery 3 is commonly connected to a negative electrode which was subjected to rectifying of the alternating current power source 2 (common bus bar CB). Meanwhile, as an electrode other than an output of the PFC circuit 12, a positive electrode 3P of the first battery 3 is inputted to the first inverter circuit 13.

The first inverter circuit 13 has three potentials as inputs, that is, the common bus bar CB of the negative electrode, the output of the PFC circuit 12 and the positive electrode 3P of the first battery 3. The first inverter circuit 13 has such a structure that the common bus bar CB is connected to a center point CP1 between a primary winding 141a of the common transformer 14 and a primary winding 141b of the common transformer 14. In the above structure, an end (lower in FIG. 1) of a terminal 141aT of the common transformer 14 is connected to a positive electrode on the alternating current power source 2 side (output of PFC circuit 12) by way of interactive switches while an end (upper in FIG. 1) of a terminal 141bT of the common transformer 14 is connected to the positive electrode 3P of the first battery 3 by way of the interactive switches.

As shown in FIG. 2(a) and FIG. 2(b), each of switches 21 to 28 forming the interactive switches has such a structure that diode(s) is(are) connected in series with the switch element, so as to bring about voltage withstandability to a reverse voltage. As a switch element, IGBT structure shown in FIG. 2(a) or MOSFET structure shown in FIG. 2(b) are to be selected, depending on voltage withstandability and the like. Moreover, as shown in FIG. 2(c) and FIG. 2(d), inversely connecting two switches in parallel forms an interactive switch. Moreover, the diode is not necessary when a switch having a reverse preventive property which is a reverse voltage withstandability is used as a switch element.

Moreover, for suppressing voltage change attributable to switchings by the interactive switches, the first inverter circuit 13 has smoothing condensers 29a, 29b between respective positive and negative electrodes. The smoothing condensers 29a, 29b are each connected to a position closer to the interactive switches.

On the other hand, the second inverter circuit 15 connected to the first inverter circuit 13 by way of the common transformer 14 is connected to the second battery 4 and functions as a rectifier during charging to the second battery 4. Moreover, the second inverter circuit 15 acts as an inverter during electricity supply from the second battery 4. The second inverter circuit 15 has such a structure that switches 31, 32 are connected in series on respective sides of a center point CP2 between secondary windings 142a, 142b of the common transformer 14. A negative electrode 4N of the second battery 4 is connected to the center point CP2 between the switches 31, 32 while a positive electrode 4P of the second battery 4 is connected to either end of the windings 142a, 142b of the common transformer 14. Turning on and off the switches 31, 32 allows the second inverter circuit 15 to act as the rectifier or inverter. Moreover, like the first inverter circuit 13 having the smoothing condensers 29a, 29b, the second inverter circuit 15 also has a smoothing condenser 33 for suppressing voltage change attributable to switchings by the switches 31, 32.

Moreover, the first battery 3 and the battery 4 are each used as a power source for supplying electric power to a load. Though not shown in FIG. 1, the load is connected to each of the first battery 3 and the second battery 4. Moreover, the electric power converter 1A has a controller 100 which turns on and off each of the switches 21 to 28 (forming the interactive switches) of the first inverter circuit 13 and turns on and off the switches 31, 32 of the second inverter circuit 15 so as to control electric power of each of the alternating current power source 2, the first battery 3 and the second battery 4. The first battery 3 is also used as a power source for driving a sensor, a calculator and the like of the controller 100.

Operation

Then, referring to FIG. 3 to FIG. 5, circuit operations of the electric power converter 1A having the above structure are to be set forth, according to the first embodiment. In such circuit operations, the following functions are accomplished, that is, the electric power is supplied from the alternating current power source 2 to the second battery 4 by way of the common transformer 14 to thereby charge the second battery 4 and the electric power is supplied from the second battery 4 to the first battery 3 by way of the common transformer 14 to thereby charge the first battery 3.

With the electric power converter 1A of the first embodiment, the operation of the first inverter circuit 13 is considered to be an inverter and a converter which are connected to respective positive electrodes (output of the PFC circuit 12 and positive electrode 3P of the first battery 3). When the first inverter circuit 13 forms the inverter connected to an output potential of the PFC circuit 12, such a circuit serves as a circuit indicated by bold lines in FIG. 3(a). Meanwhile, when the first inverter circuit 13 forms the converter connected to the output potential of the first battery 3, such a circuit serves as a circuit indicated by bold lines in FIG. 3(b). Herein, the circuit indicated by the bold lines in FIG. 3(b) serves not only as a converter for charging the first battery 3 but also can serve as an inverter.

FIG. 4(a) and FIG. 4(b) show details of the operations of the inverter in FIG. 3(a). When operating the first inverter circuit 13 as the inverter in FIG. 3(a), a circuit indicated by bold lines in FIG. 4(a) and a circuit indicated by bold lines in FIG. 4(b) are switched by turning on and off the switches 25 to 28 forming the interactive switches. With the first inverter circuit 13, the circuit indicated by the bold lines in FIG. 4(a) applies a positive voltage to the primary winding 141b of the common transformer 14 while the circuit indicated by the bold lines in FIG. 4(b) applies a negative voltage to the primary winding 141a of the common transformer 14. As such, causing the positive and negative voltages implements the electric power conversion by way of the common transformer 14.

Moreover, FIG. 5(a) and FIG. 5(b) show details of operations of the converter in FIG. 3(b). When operating the first inverter circuit 13 as the converter in FIG. 3(b), a circuit indicated by bold lines in FIG. 5(a) and a circuit indicated by bold lines in FIG. 5(b) are switched by turning on and off the switches 21 to 24 forming the interactive switches. With this, the first battery 3 can be charged from the alternating current voltage generated to the primary windings 141a, 141b of the common transformer 14.

On the other hand, other than making an operation as an inverter, the second inverter circuit 15 connected to the secondary windings 142a, 142b of the common transformer 14 can also operate as a converter for rectification. In this case, turning on and off the switches 31, 32 allows the second inverter circuit 15 to operate as the converter. With the electric power converter 1A of the first embodiment, the second inverter circuit 15 is operated as the converter during the charging of the second battery 4 from the alternating current power source 2 and is operated as the inverter during the charging of the first battery 3 from the second battery 4.

Operation of controller 100:

Then, controlling operations of the controller 100 of the electric power converter 1A are to be set forth more in detail.

Figure 6:
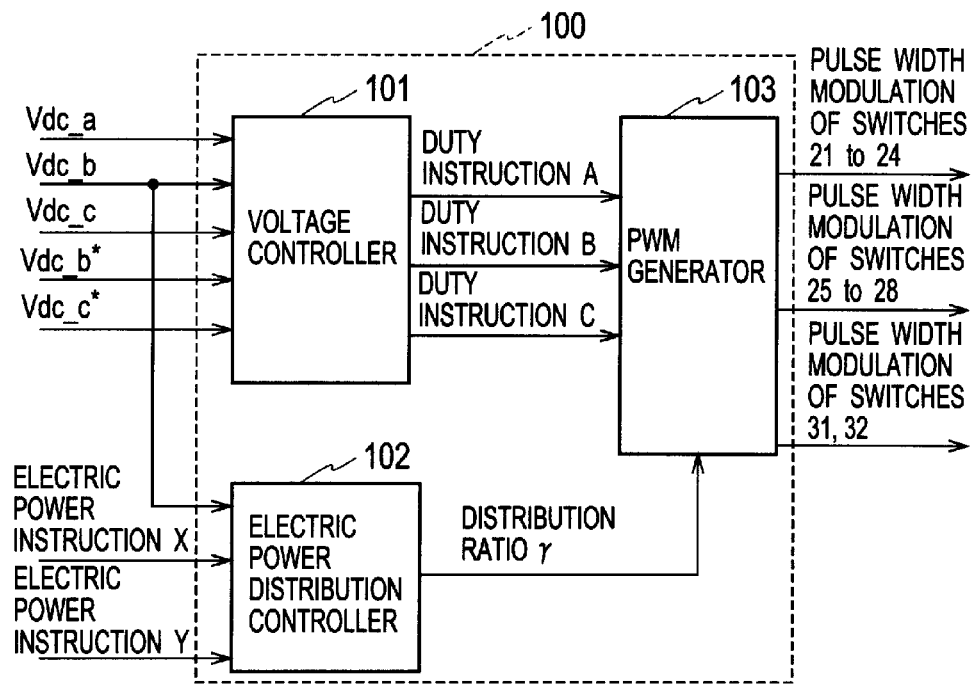
FIG. 6 is a control block diagram of a controller of the electric power converter, according to the first embodiment of the present invention.

FIG. 6 is a control block diagram of the controller 100. As shown in FIG. 6, the controller 100 includes a voltage controller 101, an electric power distribution controller 102 and a PWM generator 103 where PWM denotes Pulse Width Modulation.

Based on sensed voltages Vdc_a, Vdc_b, Vdc_c of the respective smoothing condensers 29a, 29b and 33 and based on voltage instruction values Vdc_b* and Vdc_c*, duty instructions A, B, C are to be calculated from: i) winding number ratio of primary windings 141a, 141b and secondary windings 142a, 142b of the common transformer 14 and ii) ratio of the sensed voltages Vdc_a, Vdc_b, Vdc_c. Herein, the duty instruction A is a value for instructing ON-period of the switches 25 to 28, the duty instruction B is a value for instructing ON-period of the switches 21 to 24, and the duty instruction C is a value for instructing ON-period of the switches 31, 32.

The electric power distribution controller 102 seeks for a ratio (operation time of the first inverter circuit 13 as inverter, relative to operation time of the first inverter circuit 13 as converter). With an electric power instruction X, an electric power instruction Y and the sensed voltage Vdc_b each as input, the electric power distribution controller 102 calculates a distribution ratio R which corresponds to time distribution.

Herein, the electric power instruction X is given for instructing the electric power charged to the second battery 4 and is set according to capability of the alternating current power source 2. Moreover, the electric power instruction Y is for instructing an electric power charged to the first battery 3, calculates a load electric power of the first battery 3 and provides an estimation as an electric power instruction. At first, the electric power distribution controller 102 calculates a distribution ratio R1 derived from the electric power instruction X and electric power instruction Y. The distribution ratio R1 is given by the following expression:

$$R1 = \text{electric power instruction } X / (\text{electric power instruction } X + \text{electric power instruction } Y)$$

Figure 7:
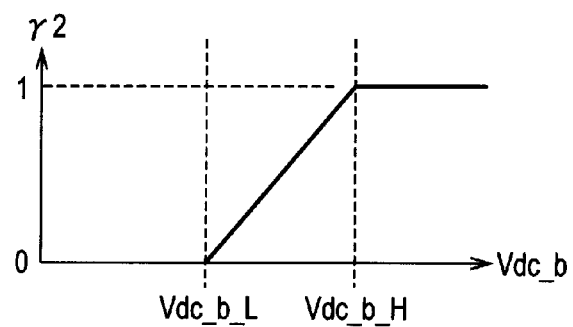
FIG. 7 shows a voltage Vdc_b of a first battery relative to a distribution ratio R2.

Moreover, the sensed voltage Vdc_b is a voltage of the first battery 3 which voltage was smoothed by means of the smoothing condenser 29b. With the electric power converter 1A of the first embodiment, as set forth above, the first battery 3 is also used for driving accessories, that is, used as a control power source. As such, for preventing a voltage drop of the sensed voltage Vdc_b of the first battery 3, a distribution ratio R2 is operated according to the sensed voltage Vdc_b. FIG. 7 shows the sensed voltage Vdc_b of the first battery 3, relative to the distribution ratio R2. As shown in FIG. 7, in the section where the sensed voltage Vdc_b of the first battery 3 is between a lower limit Vdc_b_L and a higher limit Vdc_b_H, the higher the sensed voltage Vdc_b is, the higher the distribution ratio R2 is. With the sensed voltage Vdc_b lower than the Vdc_b_L, the distribution ratio R2 is 0, thus stopping charging electricity to the second battery 4 from the alternating current power source 2 and charging only to the first battery 3 from the second battery 4. Moreover, with a 12 V lead battery used as the first battery 3, the lower limit Vdc_b_L is set, for example, at 9 V while the higher limit Vdc_b_H is set, for example, at 14 V.

As the final distribution ratio R, the electric power distribution controller 102 selects smaller one of the distribution ratio R1 and the distribution ratio R2 which are calculated through the above calculations. Then, the electric power distribution controller 102 outputs the thus selected final distribution ratio R to the PWM generator 103.

According to the distribution ratio R from the electric power distribution controller 102, the PWM generator 103 determines a time distribution, that is, a time for operating the first inverter circuit 13 as inverter and a time for operating the first inverter circuit 13 as converter. Then, according to the duty instructions A, B, C from the voltage controller 101, the PWM generator 103 generates PWM pulses for turning on and off the switches 25 to 28 in the section for operating the first inverter circuit 13 as inverter while generates PWM pulses for turning on and off the switches 21 to 24 and switches 31 and 32 in the section for operating the first inverter circuit 13 as converter.

Figure 8:
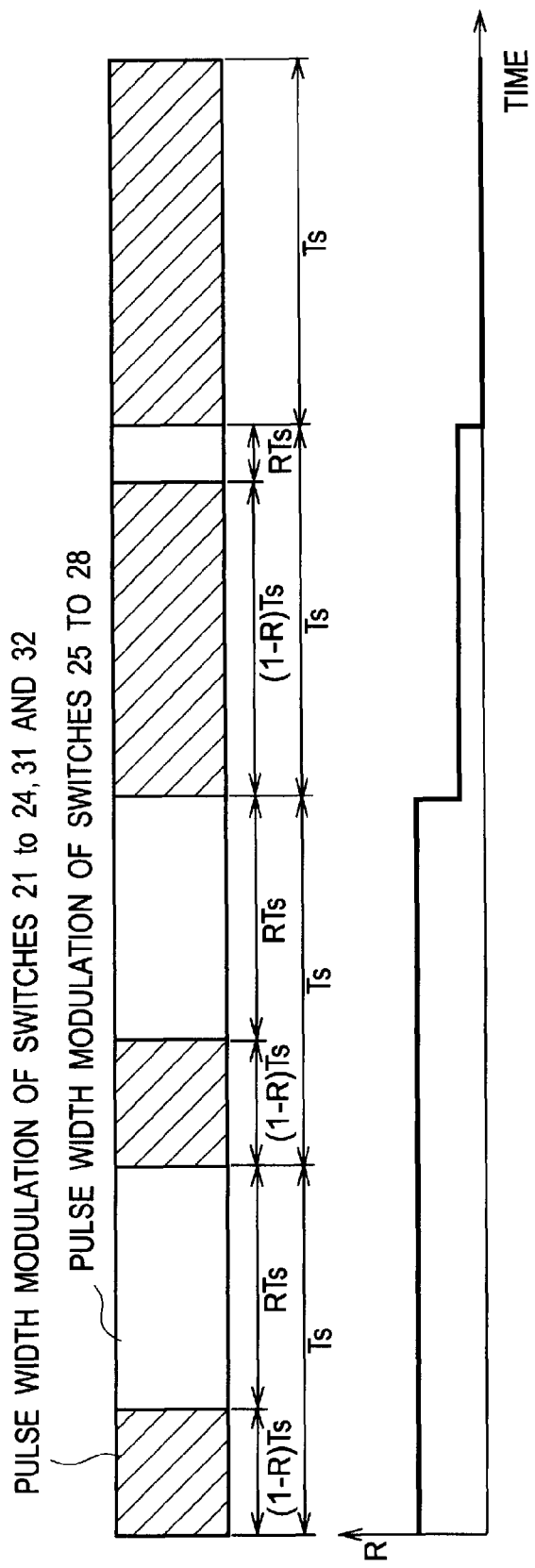
FIG. 8 is a timing chart showing an example of a time distribution, that is, a time for operating the inverter circuit on the primary side as an inverter relative to a time for operating the inverter circuit on the primary side as an converter.

FIG. 8 shows an example of the time distribution relative to the distribution ratio R. In FIG. 8, Ts denotes one frequency of PWM and sets a PWM carrier frequency. The PWM generator 103 divides the frequency Ts according to the distribution ratio R. In the section of (1−R)Ts, the PWM generator 103 generates PWM pulse for turning on and off the switches 21 to 25 and switches 31, 32, according to the duty instruction B and duty instruction C respectively. In the section of R×Ts, the PWM generator 103 generates PWM pulse for turning on and off the switches 25 to 28, according to the duty instruction A. With this, an electric power from the second battery 4 is supplied to the first inverter circuit 13 side by way of the common transformer 14, following a path indicated by bold lines in FIG. 9(b). Then, the electric power is rectified by means of the switches 21 to 24 and then is charged to the first battery 3. Then, in the section of R×Ts, an electric power from the alternating current power source 2 is supplied to the second inverter circuit 15 side by way of the common transformer 14 and is charged to the second battery 4, following a path indicated by the bold lines in FIG. 9(a). Herein, the rectifier 11 and the PFC circuit 12 each operate regardless of the electric power distribution. Moreover, the electric power of each of the alternating current power source 2, the first battery 3 and the second battery 4 is time-averaged through the smoothing condensers 29a, 29b, 33. As such, the above operations by the electric power converter 1A can be regarded as continuous operations which can be accomplished when the electric power control is implemented by means of a plurality of electric power converters.

As set forth above in detail by raising specific examples, with the electric power converter 1A of the first embodiment, the controller 100 turns on and off the switches 21 to 28 of the first inverter circuit 13 on the primary side of the common transformer 14 and the switches 31 and 32 of the second inverter circuit 15 on the secondary side of the common transformer 14. As such, the electric power control between a plurality of power sources, that is, a control of charging from the alternating current power source 2 to the second battery 4 and charging from the second battery 4 to the first battery 3 is accomplished by means of the circuit which commonly uses the single common transformer 14 and also windings, thus miniaturizing the electric power converter. Especially, this type of electric power converter is large in weight and volume of the transformer, which is disadvantageous in terms of miniaturization. Therefore, common use of the transformer is greatly effective for miniaturization.

Figure 10:
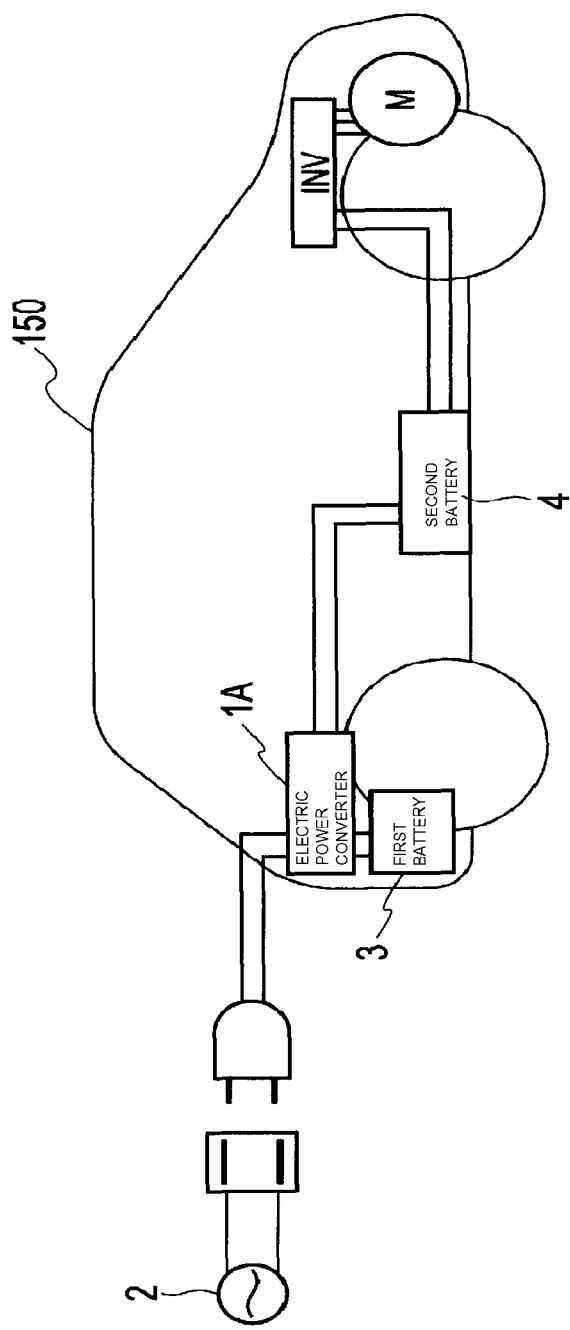
FIG. 10 shows an example of a layout when the electric power converter of the first embodiment is installed in an electric vehicle.

Moreover, as set forth above, the electric power converter 1A of the first embodiment is effective as an electric power converter that is installed, especially, in an electric vehicle. FIG. 10 shows an example of a layout where the electric power converter 1A of the first embodiment is installed in an electric vehicle 150. In the example shown in FIG. 10, the first battery 3 is a low-voltage battery for driving accessories, the second battery 4 is a high-voltage battery for supplying an electric power to a driving motor M. A conventional electric vehicle includes a charger for charging a high-voltage battery from an outer single-phase alternating current and a DC-DC converter for charging a low-voltage battery (for driving accessories) from the high-voltage battery. On the other hand, the electric power converter 1A of the first embodiment of the present invention can accomplish the above functions by means of a single apparatus and the electric power converter 1A per se is small in size, thus accomplishing light weight of the vehicle and enhancing free layout in the installation into the vehicle, to thereby make vehicle design easy.

Moreover, the electric power converter 1A of the first embodiment has the rectifier 11 for rectifying the input voltage of the alternating current power source 2. As such, though the electric power converter 1A has such a structure that the negative electrode of the alternating current power source 2 and the negative electrode 3N of the first battery 3 are connected to the common bus bar CB to thereby form a common electrode, potential difference between the positive electrode side of the alternating current power source 2 and the positive electrode 3P side of the first battery 3 can be kept.

Moreover, with the electric power converter 1A of the first embodiment, based on the distribution ratio R1=electric power instruction X/(electric power instruction X+electric power instruction Y), the controller 100 seeks for the time distribution, that is, the time for supplying the electric power from the alternating current power source 2 to the second battery 4 and the time for supplying the electric power from the second battery 4 to the first battery 3. According to the thus obtained time distribution, the controller 100 turns on and off the switches 21 to 28 of the first inverter circuit 13 and the switches 31 and 32 of the second inverter circuit 15. As such, according to scale of the load power that is demanded or estimated, the controller 100 can properly control the electric power charged from the alternating current power source 2 to the second battery 4 and the electric power charged from the second battery 4 to the first battery 3. Moreover, by means of the operations of the time ratio for operating the switches 21 to 28 and the switches 31, 32, time of each of the above electric powers is rendered a ratio of a short period. As such, the electric power which was time-averaged and passes through the first inverter circuit 13 and second inverter circuit 15 can be subjected to continuous operations like those accomplished when the electric power control is implemented by means of a plurality of electric power converters.

Moreover, with the electric power converter 1A of the first embodiment, according to the sensed voltage Vdc_b of the first battery 3, the controller 100 adjusts the time distribution, that is, the time for supplying the electric power from the alternating current power source 2 to the second battery 4 and the time for supplying the electric power from the second battery 4 to the first battery 3. As such, when the charged state of the first battery 3 is decreased judging from voltage, electric charging to the first battery 3 can be prioritized, thus preventing in advance a problem of control failure which may be caused by a voltage drop of the first battery 3 used as a power source of the controller 100.

Second Embodiment

Then, a second embodiment of the present invention is to be set forth.

Figure 11:
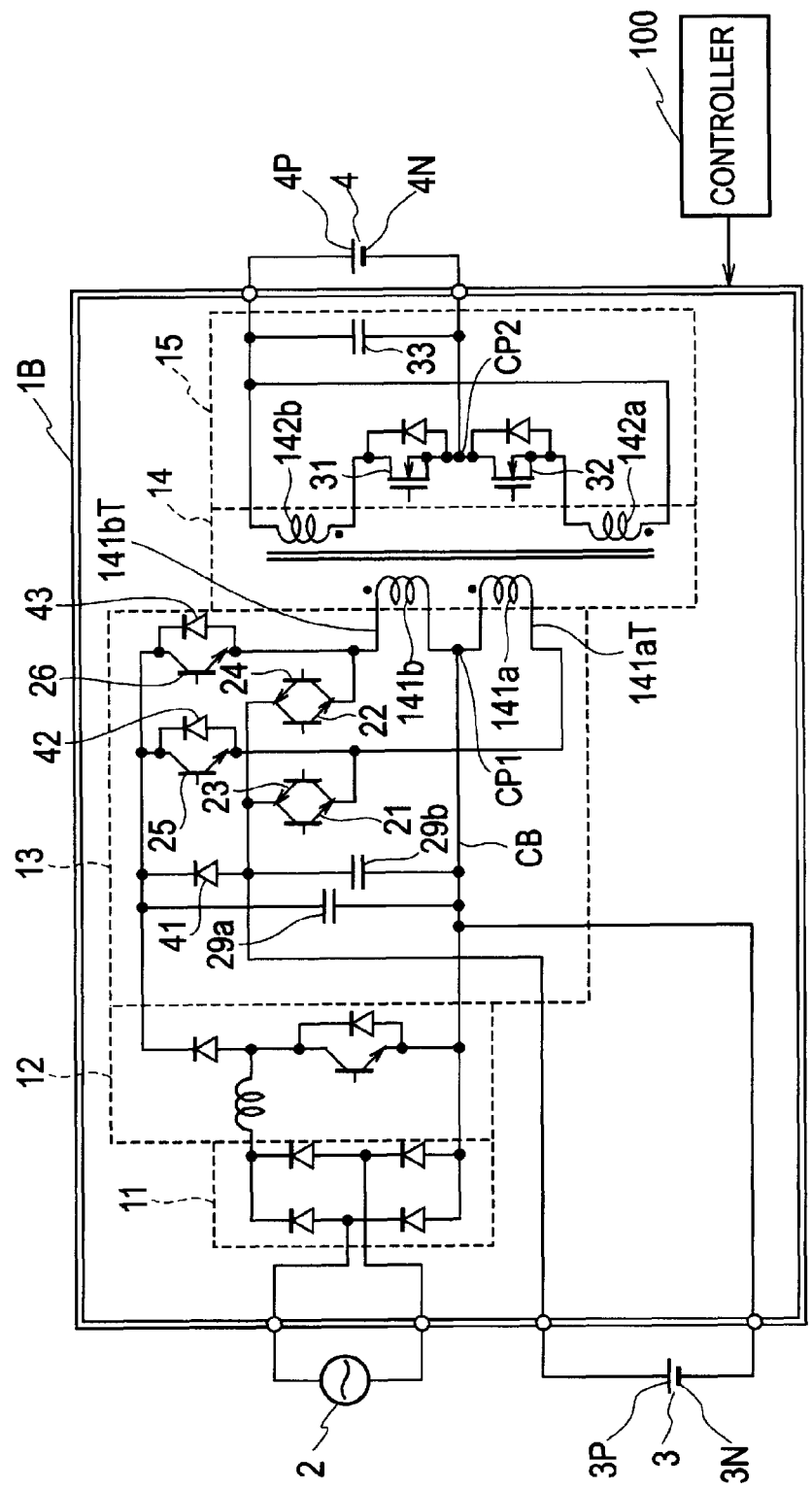
FIG. 11 is a circuit diagram showing a structure of an electric power converter, according to a second embodiment of the present invention.

FIG. 11 is a circuit diagram showing a structure of an electric power converter 1B, according to the second embodiment of the present invention. The electric power converter 1B of the second embodiment has such a structure that connecting the smoothing condenser 29a with the smoothing condenser 29b by way of a diode 41 can keep the voltage of the smoothing condenser 29a more than or equal to the voltage of the smoothing condenser 29b. Herein, basic structure and operations of the electric power converter 1B of the second embodiment are like those of the electric power converter 1A of the first embodiment. Therefore, structural elements that are common to or corresponding to those of the first embodiment are denoted by the same numerals and repeated descriptions are to be omitted.

With the electric power converter 1B of the second embodiment, the circuit has such a structure that the diode 41 keeps the voltage of the smoothing condenser 29a more than or equal to the voltage of the smoothing condenser 29b. As such, even when the alternating current power source 2 is suspended or fails to be connected, potential difference is not reversed. As such, the switches 25, 26 of the first inverter circuit 13 do not need having a structure to have the reverse voltage withstandability which is shown in FIG. 2(a) and FIG. 2(b), thus eliminating the need of a diode in series with the switch(es). Moreover, there is no need of cutting, by means of a switch, the path from the smoothing condenser 29b to the smoothing condenser 29a. As such, the switches 27, 28 inversely connected in parallel to the switches 25, 26 are not necessary. In sum, diodes 42, 43 alone be connected in parallel to the respective switches 25, 26. Moreover, when the alternating current power source 2 is not connected, the diode 41 connected between the smoothing condenser 29a and the smoothing condenser 29b can charge the smoothing condenser 29a.

As set forth above, the electric power converter 1B of the second embodiment has such a structure that the diode 41 keeps the voltage of the smoothing condenser 29a more than or equal to the voltage of the smoothing condenser 29b. As such, the number of switches of the first inverter circuit 13 is further decreased (i.e., switches 27, 28 not needed), thus accomplishing further smaller size and lower cost. Moreover, in view of applicability to the electric vehicle 150, 12 V lead battery is frequently used for the first battery 3 for driving accessories, meanwhile a commercial power source such as 100 V rms is used as the alternating current power source 2. As such, the voltage after rectification is higher than the voltage of the first battery 3. With this, the electric power converter 1B preventing the reverse voltage and accomplishing small size can be effectively used, according to the second embodiment.

Third Embodiment

Then, a third embodiment of the present invention is to be set forth.

Figure 12:
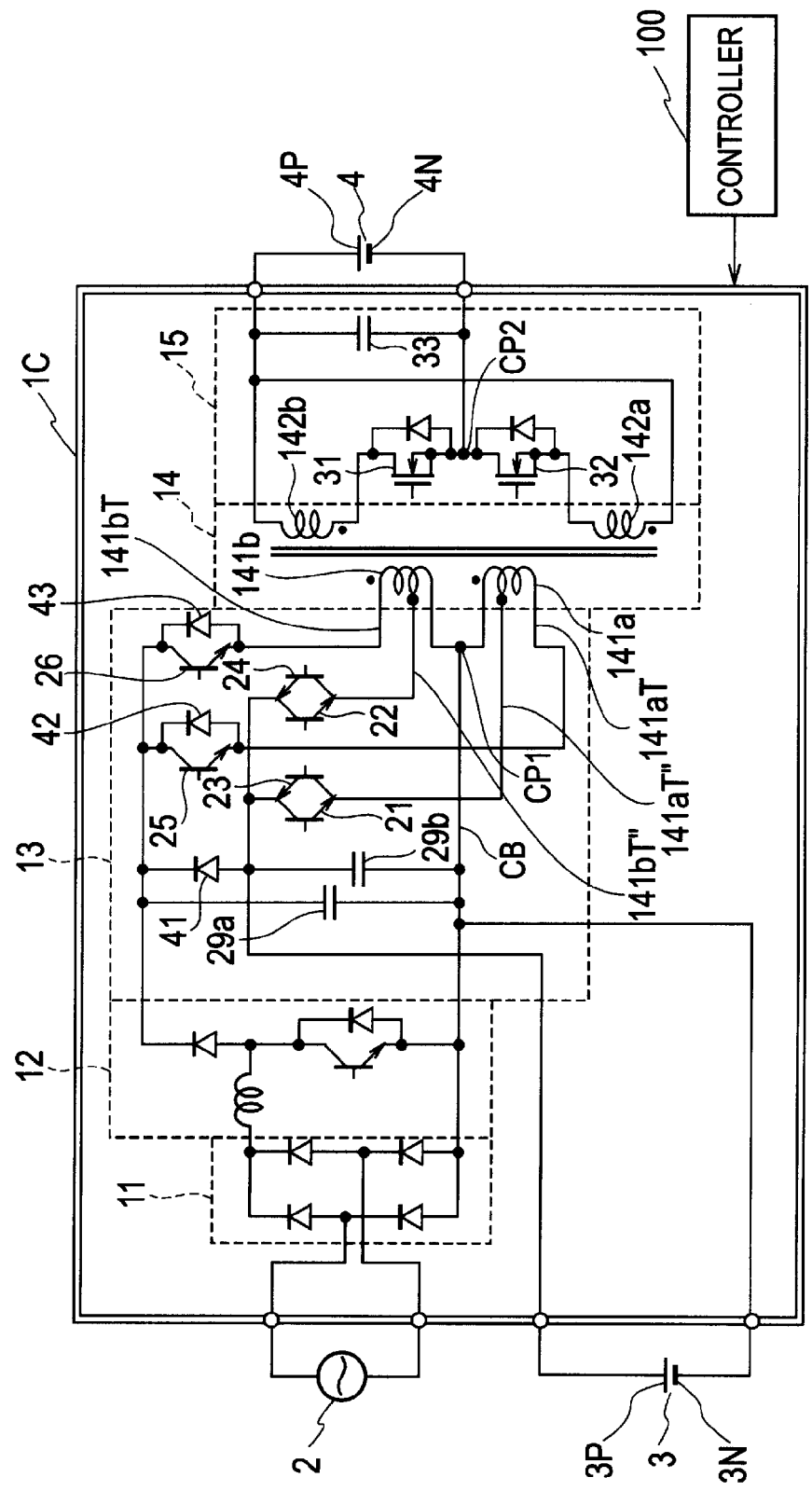
FIG. 12 is a circuit diagram showing a structure of an electric power converter, according to a third embodiment of the present invention.

FIG. 12 is a circuit diagram showing a structure of an electric power converter 1C, according to the third embodiment of the present invention. The electric power converter 1C of the third embodiment has such a structure that en route terminals 141aT", 141bT" are provided on the way of the respective primary windings 141a, 141b of the common transformer 14, thus connecting the switches 21 to 24 of the first inverter circuit 13 to the en route terminals 141aT", 141bT". Herein, basic structure and operations of the electric power converter 1C of the third embodiment are like those of the electric power converter 1B of the second embodiment. Therefore, structural elements that are common to or corresponding to those of the second embodiment are denoted by the same numerals and repeated descriptions are to be omitted.

With the electric power converter 1C of the third embodiment, the common bus bar CB is connected to the center point CP1 between the primary windings 141a, 141b of the common transformer 14. Moreover, the terminals 141aT, 141bT at either ends of the respective primary windings 141a, 141b are connected to the positive electrode (output of the PFC circuit 12) on the alternating current power source 2 side by way of the respective switches 25, 26 of the first inverter circuit 13. Moreover, the en route terminals 141aT", 141bT" disposed on the way of the respective primary windings 141a, 141b are connected to the positive electrode 3P of the first battery 3 by way of the switches 21 to 24. Herein, the number of windings for disposing the terminals 141aT, 141bT, 141aT", 141bT" of the primary windings 141a, 141b is to be set in view of the voltage when the first battery 3 is ordinarily used.

As set forth above, the electric power converter 1C of the third embodiment has such a circuit structure that the switches 21 to 24 of the first inverter circuit 13 are connected to the en route terminals 141aT", 141bT" disposed on the way of the respective primary windings 141a, 141b of the common transformer 14. As such, implementing switchings of the switches 21 to 24 from the lower voltage of the en route terminals 141aT", 141bT" disposed on the way of the primary windings 141a, 141b can decrease loss of the switches 21 to 24 (Loss of switch includes a constant loss during the on-period and a switching loss. The switching loss is a product of current and voltage, therefore, the loss can be decreased when making the switching from the lower voltage). As such, the electric power converter 1C of the third embodiment can efficiently charge electricity to the second battery 4, thus miniaturizing a cooler for radiating heat of the switch and decreasing electric power consumption.

Fourth Embodiment

Then, a fourth embodiment of the present invention is to be set forth.

Figure 13:
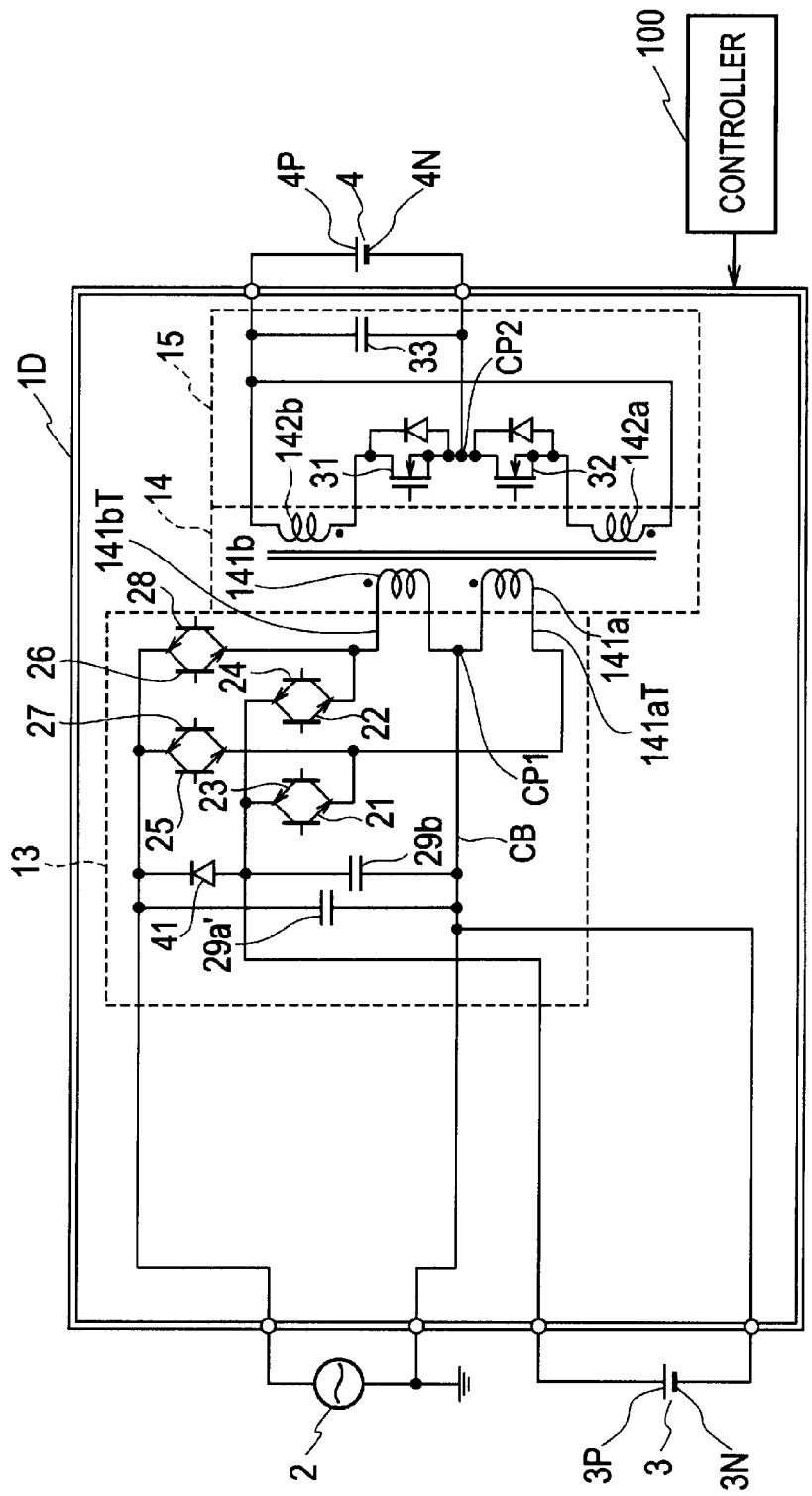
FIG. 13 is a circuit diagram showing a structure of an electric power converter, according to a fourth embodiment of the present invention.

FIG. 13 is a circuit diagram showing a structure of an electric power converter 1D, according to the fourth embodiment of the present invention. The electric power converter 1D of the fourth embodiment has such a structure that an AC output of the alternating current power source 2 is directly inputted to the first inverter circuit 13, instead of providing the rectifier 11 or the PFC circuit 12. Moreover, other structure and operations of the electric power converter 1D of the fourth embodiment are like those of the electric power converter 1A of the first embodiment, therefore, structural elements that are common to or corresponding to those of the first embodiment are denoted by the same numerals and repeated descriptions are to be omitted.

The alternating current power source 2 which is an ordinary single-phase 100 V power source is connected to the electric power converter 1D of the fourth embodiment. The alternating current power source 2 has a first potential which is grounded. With the electric power converter 1D of the fourth embodiment, the input of the alternating current power source 2 is connected to a condenser 29a' not by way of the rectifier 11 or PFC circuit 12. The condenser 29a' is smaller in capacity than the smoothing condenser 29a of the first embodiment. The capacity of the condenser 29a' is capable of absorbing the ripple current caused by switchings of the switches 25 to 28 and is smaller than the capacity of the smoothing condenser 29b on the first battery 3 side.

Figure 14:
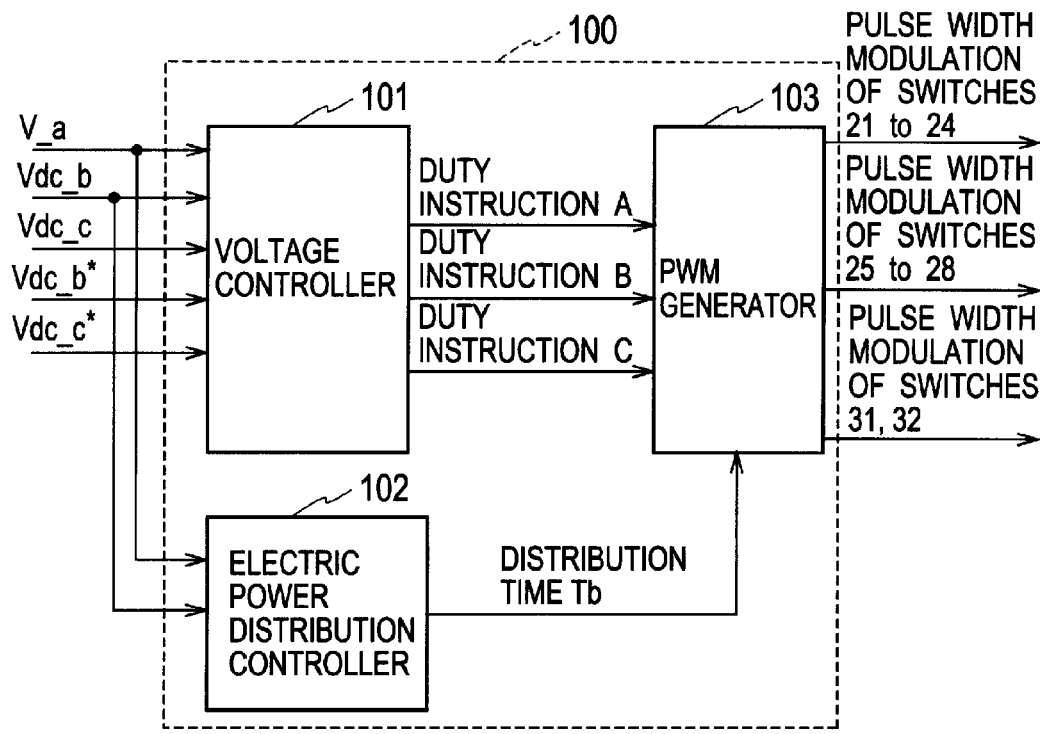
FIG. 14 is a control block diagram of the controller of the electric power converter, according to the fourth embodiment.

FIG. 14 is a control block diagram of the controller 100 of the electric power converter 1D of the fourth embodiment. The electric power converter 1D of the fourth embodiment implements the following operation. With a voltage V_a of the condenser 29a' (input voltage of the alternating current power source 2) and the voltage Vdc_b of the condenser 29b (voltage of the first battery 3) as inputs, the electric power distribution controller 102 of the controller 100 seeks for a distribution time Tb for distributing a period of the alternating current power source 2 based on the thus input voltages V_a, Vdc_b. The distribution time Tb is for charging the first battery 3 from the second battery 4. Of the period Tac of the alternating current power source 2, time for charging the second battery 4 from the alternating current power source 2 is denoted by Tac−Tb.

Figure 15:
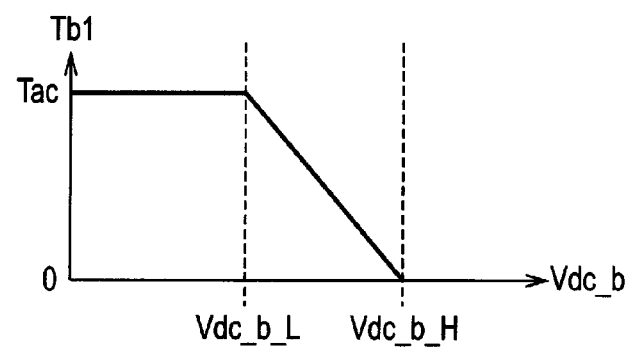
FIG. 15 shows a voltage Vdc_b of the first battery relative to a distribution time Tb1.

For preventing charging from the alternating current power source 2 to the second battery 4 when the voltage V_a of the condenser 29a' is lower than a certain threshold voltage Va_th, the electric power distribution controller 102 calculates a distribution time Tb0 as time distribution. The distribution time Tb0 can be obtained through a comparison of the voltage V_a of the condenser 29a' with the certain threshold voltage Va_th. Moreover, the electric power distribution controller 102 calculates a distribution time Tb1 for preventing a voltage drop of the sensed voltage Vdc_b of the first battery 3. Based on the sensed voltage Vdc_b of the first battery 3 relative to the distribution time Tb1, as shown in FIG. 15, the distribution time Tb1 can be calculated from the sensed voltage Vdc_b of the first battery 3. Moreover, of the distribution time Tb0 and distribution time Tb1 thus obtained, the electric power distribution controller 102 selects the larger one as a final distribution time Tb and then outputs the final distribution time Tb to the PWM generator 103.

According to the distribution time Tb from the electric power distribution controller 102, the PWM generator 103 generates PWM pulses for turning on and off the switches 21 to 24 and the switches 31, 32 in the section for charging the first battery 3 from the second battery 4 and generates PWM pulses for turning on and off the switches 21 to 24 and the switches 31, 32 in the section for charging the second battery 4 from the alternating current power source 2. With the above controlling operations, turning on and off of the switches 25 to 28 are not implemented when the voltage V_a of the condenser 29a' is lower than the certain threshold voltage Va_th, and thereby the common transformer 14 is not required of a high-voltage boosting ratio for charging the second battery 4. As such, the winding number ratio of the windings of the common transformer 14 does not need to be increased therefor.

Figure 16:
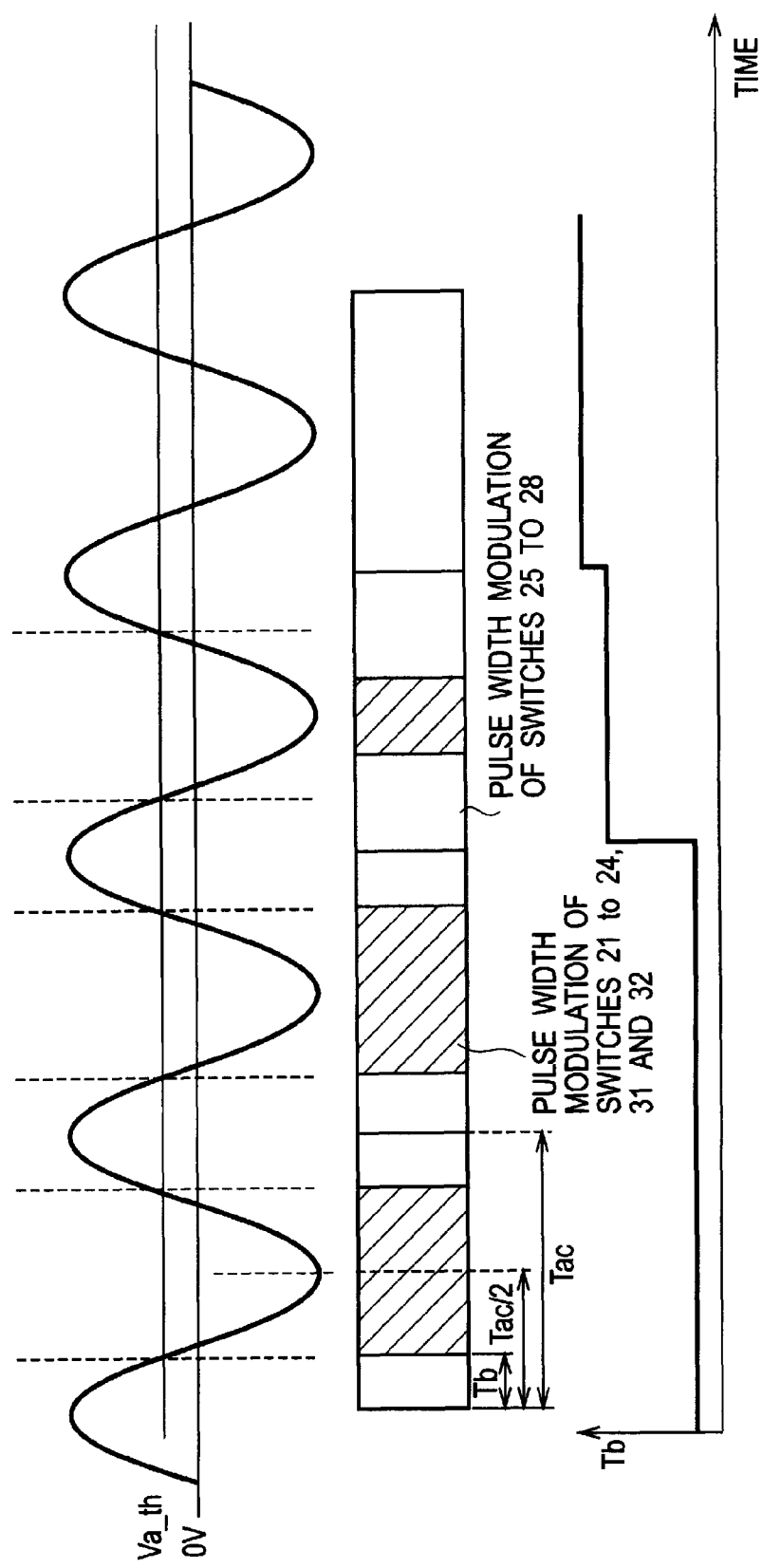
FIG. 16 is a timing chart showing an example of a time distribution, that is, a time for charging the second battery by supplying an electric power from the alternating current power source to the secondary side by way of the common transformer relative to a time for charging the first battery by supplying an electric power from the second battery to the primary side by way of the common transformer.

FIG. 16 shows an example of the time distribution of the voltage V_a of the condenser 29a' relative to the distribution time Tb. As shown in FIG. 16, when the sensed voltage Vdc_b of the first battery 3 is sufficiently high, switching the switches 21 to 24 and the switches 31, 32 in the range where the voltage V_a of the condenser 29a' is lower than the certain threshold voltage Va_th charges the first battery 3 from the second battery 4 while switching the switches 25 to 28 in the range where the voltage V_a of the condenser 29a' is higher than the certain threshold voltage Va_th charges the second battery 4 from the alternating current power source 2. Moreover, when the sensed voltage Vdc_b of the condenser 29a' is lower, operating the distribution time Tb changes the charging time of the first battery 3, thus controlling the charging amount of the first battery 3.

As set forth above, the electric power converter 1D of the fourth embodiment has such a structure that the AC output of the alternating current power source 2 is inputted directly to the first inverter circuit 13 without providing the rectifier 11 or PFC circuit 12, thereby accomplishing further miniaturization and low cost of the entire apparatus. Moreover, in view of applicability to the electric vehicle 150, the 12 V lead battery used as the first battery 3 (for accessories) and the single-phase 100 V as the alternating current power source 2 each have a first terminal that is grounded. As such, the grounded side of each is connected to the common bus bar CB while a second terminal is connected to the primary windings 14a, 14b of the common transformer 14 without rectifying the second terminal, and in this state, the controller 100 implements the distribution control without implementing the switchings in the low-voltage range. With this, the electric power conversion by way of the common transformer 14 can be properly implemented, without unnecessarily increasing the winding number ratio of the windings of the common transformer 14.

Moreover, with the electric power converter 1D of the fourth embodiment, the controller 100 turns on and off the switches 21 to 28 of the first inverter circuit 13 and the switches 31, 32 of the second inverter circuit 15 such that the charging is implemented from the alternating current power source 2 to the second battery 4 in the range where the input voltage V_a of the alternating current power source 2 is higher than the certain threshold voltage Va_th and that the charging is implemented from the second battery 4 to the first battery 3 in the range where the input voltage V_a of the alternating current power source 2 is lower than the certain threshold voltage Va_th. As such, when selecting the winding number ratio of the common transformer 14, designing the winding number ratio of the windings of the common transformer 14 is facilitated, without the need of converting the electric power by taking a high boosting ratio from the low alternating current voltage. Moreover, charging the second battery 4 in the range where the input voltage V_a of the alternating current power source 2 is higher than the certain threshold voltage Va_th can prevent in advance an increased loss which may be caused in the electric power conversion. Moreover, the charging of the first battery 3 is implemented in the period Tac of the alternating current power source 2, thus keeping a proper charging amount of the first battery 3.

Moreover, the electric power converter 1D of the fourth embodiment has the following operations. According to the sensed voltage Vdc_b of the first battery 3, the controller 100 adjusts the time distribution, that is, the time for charging the second battery 4 from the alternating current power source 2 and the time for charging the first battery 3 from the second battery 4. As such, when the charging state of the first battery 3 is decreased, the charging to the first battery 3 can be prioritized, thus preventing in advance a problem of control failure which may be caused by a voltage drop of the first battery 3 used as a power source of the controller 100.

INDUSTRIAL APPLICABILITY

The above embodiments of the present invention exemplify an application of the present invention. Therefore, it is not intended that technical scope of the present invention is limited to the contents disclosed as the embodiments. In other words, the technical scope of the present invention is not limited to the specific technical matters disclosed in the above embodiments and thereby includes modifications, changes, alternative techniques and the like easily lead by the above disclosure.

This application is based on a prior Japanese Patent Application No. P2009-006543 (filed on Jan. 15, 2009 in Japan). The entire contents of the Japanese Patent Application No. P2009-006543 from which priority is claimed are incorporated herein by reference, in order to take some protection against translation errors or omitted portions.

The scope of the present invention is defined with reference to the following claims.

The invention claimed is:

1. An electric power converter for transmitting and receiving, by way of a transformer, an electric power between an alternating current power source and a second battery or between a first battery and the second battery, the electric power converter comprising:
   a common bus bar for connecting the following members to a primary winding of the transformer:
      a first electrode of the alternating current power source, and
      a first electrode of the first battery;
   a first switch circuit for selectively connecting the following members to the primary winding of the transformer:
      a second electrode of the alternating current power source, and
      a second electrode of the first battery,
      wherein the first switch circuit is adapted to implement an electric power conversion;
   a second switch circuit for connecting the second battery to a secondary winding of the transformer,
      wherein the second switch circuit is adapted to implement the electric power conversion; and
   a controller for controlling the electric power of each of the alternating current power source, the first battery and the second battery by turning on and off a switch of the first switch circuit and a switch of the second switch circuit.

2. The electric power converter according to claim 1, further comprising:
   a rectifying circuit for rectifying an input voltage of the alternating current power source,
   wherein
   the common bus bar connects the following members to the primary winding of the transformer:
      a first end of an output of the rectifying circuit, and
      the first electrode of the first battery, and
   the first switch circuit selectively connects the following members to the primary winding of the transformer:
      a second end of the output of the rectifying circuit, and
      the second electrode of the first battery.

3. The electric power converter according to claim 2, wherein the second end of the output of the rectifying circuit is connected to the second electrode of the first battery by way of a diode.

4. The electric power converter according to claim 3, wherein
   the common bus bar connects the following members to the primary winding of the transformer:
      a negative electrode side of the output of the rectifying circuit, and
      a negative electrode of the first battery,
   the diode is disposed between a positive electrode of the first battery and a positive electrode side of the output of the rectifying circuit such that a direction from the positive electrode of the first battery to the positive electrode side of the output of the rectifying circuit is forward, and
   the first switch circuit connects the positive electrode of the first battery to the primary winding of the transformer by way of the switch of the first switch circuit having a reverse voltage withstandability, and
   the first switch circuit connects the positive electrode of the output of the rectifying circuit to the primary winding of the transformer by way of the switch of the first switch circuit, absent from the reverse voltage withstandability.

5. The electric power converter according to claim 1, wherein
   the controller calculates a time distribution of a time for supplying the electric power from the alternating current power source to the second battery by way of the transformer relative to a time for supplying the electric power from the second battery to the first battery by way of the transformer, based on a ratio which is obtained by the following expression:

ratio=electric power instruction $X$/(electric power instruction $X$+electric power instruction $Y$)

where X denotes a charging electric power required for the second battery and Y denotes a charging electric power required for the first battery, and according to the time distribution, the controller turns on and off the switch of the first switch circuit and the switch of the second switch circuit.

6. The electric power converter according to claim 5, wherein the controller monitors a voltage of the first battery, and according to the monitored voltage of the first battery, the controller adjusts the time distribution of the time for supplying the electric power from the alternating current power source to the second battery by way of the transformer relative to the time for supplying the electric power from the second battery to the first battery by way of the transformer.

7. The electric power converter according to claim 1, wherein the common bus bar connects the following members to the primary winding of the transformer:
a ground terminal of the alternating current power source, and
a negative electrode of the first battery, and the first switch circuit selectively connects the following members to the primary winding of the transformer:
another terminal of the alternating current power source other than the ground terminal of the alternating current power source, and
a positive electrode of the first battery.

8. The electric power converter according to claim 7, wherein the controller monitors an input voltage of the alternating current power source, and the controller turns on and off the switch of the first switch circuit and the switch of the second switch circuit, such that:
in a section where the monitored input voltage of the alternating current power source is higher than a certain threshold, the electric power is supplied from the alternating current power source to the second battery by way of the transformer, and
in a section where the monitored input voltage of the alternating current power source is lower than the certain threshold, the electric power is supplied from the second battery to the first battery by way of the transformer.

9. The electric power converter according to claim 8, wherein the controller monitors a voltage of the first battery, and according to the monitored voltage of the first battery, the controller adjusts a time distribution of a time for supplying the electric power from the alternating current power source to the second battery by way of the transformer relative to a time for supplying the electric power from the second battery to the first battery by way of the transformer.

10. The electric power converter according to claim 1, wherein an en route terminal for dividing a number of primary windings of the transformer is provided on the primary winding of the transformer, and the second electrode of the first battery is connected to the en route terminal by way of the switch of the first switch circuit.

11. An electric power converting method for transmitting and receiving, by way of a transformer, an electric power between an alternating current power source and a second battery or between a first battery and the second battery, the method comprising:

connecting the following members to a primary winding of the transformer:
a first electrode of the alternating current power source, and
a first electrode of the first battery;

selectively connecting, by way of a first switch circuit, the following members to the primary winding of the transformer:
a second electrode of the alternating current power source, and
a second electrode of the first battery,
wherein the selective connecting operation is adapted to implement an electric power conversion;

connecting, by way of a second switch circuit, the second battery to a secondary winding of the transformer,
wherein the connecting of the secondary winding is adapted to implement the electric power conversion; and controlling the electric power of each of the alternating current power source, the first battery and the second battery by turning on and off a switch of the first switch circuit and a switch of the second switch circuit.

12. An electric power converter for transmitting and receiving, by way of a transformer, an electric power between a plurality of voltages and an output voltage, the electric power converter comprising:

a common bus bar for connecting a first end side of each of the plurality of the voltages to a primary winding of the transformer;

a first switch circuit for selectively connecting a second end side of the each of the plurality of the voltages to the primary winding of the transformer, wherein the first switch circuit is adapted to implement an electric power conversion;

a second switch circuit for connecting the output voltage to a secondary winding of the transformer, wherein the second switch circuit is adapted to implement the electric power conversion; and a controller for controlling the electric power of each of the plurality of the voltages and the electric power of the output voltage by turning on and off a switch of the first switch circuit and a switch of the second switch circuit.

* * * * *